United States Patent [19]

Anderson et al.

[11] Patent Number: 5,418,549
[45] Date of Patent: May 23, 1995

[54] RESOLUTION COMPENSATING SCROLL BAR VALUATOR

[75] Inventors: Howard C. Anderson, Tempe; Dennis Wodarz, Fountain Hills, both of Ariz.

[73] Assignee: Motorola, Inc., Schaumburg, Ill.

[21] Appl. No.: 75,980

[22] Filed: Jun. 14, 1993

[51] Int. Cl.6 .......................... G09G 5/34; G09G 5/08
[52] U.S. Cl. .................................. 345/145; 345/123; 395/155
[58] Field of Search ................... 345/121, 123–125, 345/145, 146; 395/155, 156

[56] References Cited

U.S. PATENT DOCUMENTS 5,196,838  3/1993  Meier et al.
5,202,961  4/1993  Mills et al.

FOREIGN PATENT DOCUMENTS 3-68997   3/1991  Japan.
3-237492  10/1991 Japan.
4-19793   1/1992  Japan.
4-110999  4/1992  Japan.

Primary Examiner—Jeffery A. Brier
Attorney, Agent, or Firm—Harold C. McGurk; S. Kevin Pickens

[57] ABSTRACT

A method is provided for using a scroll bar to select and view exact pages of a document without downloading unwanted pages of the document. Instead of displaying all the pages before a particular page is selected via scroll bar, the method does not display any of the incremental or unwanted pages before the actual selected page is selected, retrieved and displayed.

15 Claims, 2 Drawing Sheets

RESOLUTION COMPENSATING SCROLL BAR VALUATOR

TECHNICAL FIELD

This invention relates generally to user interface methods for computer systems and, in particular, to a method for selecting an exact page of information by using a scroll bar.

BACKGROUND OF THE INVENTION

Some conventional user interface methods provide a scroll bar for scrolling through pages of a document. For example, Microsoft Word is a word processing software program commercially available from Microsoft Corporation that use two scroll bars for scrolling through pages of a document. Typically in Microsoft Word, a vertical scroll bar is used to control movement or to scroll through lines and pages of a document, while a horizontal scroll bar controls movement through words in a line.

Such conventional scroll bar systems usually comprise two arrows and a slider. Each arrow controls which direction a user wants to scroll through a document. An arrow conventionally controls movement through a document in small increments or small blocks of information, such as individual lines or a page of a document, for example. Moreover, if an arrow points in the upward direction, the document will be scrolled from its present position in the document toward the first page. If an arrow points in the downward direction, the document will be scrolled from its present position in a document toward the last page of the document.

A slider is conventionally used to control movement through a document in larger increments than when the arrows are used. Instead of incrementing by small blocks of information, the slider typically controls movement through a document in larger blocks, increments or groups of information, such as two or more pages, for example. Therefore, when a user wants to go from the first page to the fiftieth page, the slider is usually selected and moved until page fifty is selected.

One of the disadvantages of conventional scroll bar methods is that a page of information is always displayed after a user presses a mouse button to select one of the scrolling features (i.e., slider, arrows) and then releases the mouse button. Conventional scroll bar methods lack the capability of disabling or hindering the display of unwanted pages of information when a slider of a scroll bar is unable to obtain an exact page. Such a situation is critical when a user wants to view a large document comprising many pages of information, but the scroll bar region or space is inadequate to represent all the pages of a document. In other words, conventional scroll bar methods make no allowance for fine adjustments of the slider value when the screen resolution is insufficient to yield the precise page the user may wish to obtain.

Suppose for example that a document had over one-hundred pages of information and a user wanted to display the seventy-fifth page of the document. However, the size of or number of pixels in the scroll bar region representing the one-hundred pages of information was small because the size of the corresponding window was small. Therefore, when the user moves the slider, the page number adjusts in increments of ten, thirteen or even twenty pages. The user is unable to move the slider of the scroll bar to the exact page because the screen and scroll bar resolution does not permit such a precise page selection.

When a user is unable to move the slider of the scroll bar to an exact page, the user must use a combination of the slider and arrows to incrementally obtain the desired page. This process results in displaying each of the incremental pages or unwanted pages of information. Such a process of displaying every incremental, unwanted page may waste a considerable amount of time if the user is connected across a network to a remote location. The reason is due to the time wasted in sending a request over the network, searching a database for unwanted pages and transmitting the unwanted pages to the user's remote computer. This process only clutters network traffic with unnecessary requests for information and reduces the speed of network coummunication.

Conventional scroll bar systems also are disadvantaged in that the page number is not continuously updated when the arrows are being used to scroll through text or pages of a document. For example, when a user selects one of the arrows by pressing a button on a mouse, the display begins to scroll through the text or pages of a document. However, the current page or position is neither updated nor displayed. When the button on the mouse is released by the user, the text stops scrolling and the page number will be displayed. Therefore, it is impossible to determine the current position or page within a document without releasing the mouse button.

Some conventional scroll bar methods that do not use a slider require that a user enter the number of the desired page or item. Such systems are archaic and inflexible because a user usually does not know which page contains the information the user wants.

Accordingly, there exists a significant need for a scroll bar method that permits a user to select an exact page of information when the region of the scroll bar is smaller than the total number of pages of a document and to display the selected page without displaying any unwanted pages of the document.

SUMMARY OF THE INVENTION

The present invention has utility in using a scroll bar to select and view exact pages of a document without scrolling and downloading unwanted pages of the document. Since page downloading could consume a considerable amount of time, the method saves the user time and saves system time by not downloading unwanted pages from a network server to a user's workstation. The exact page can be selected by a user before the page is retrieved, downloaded and displayed.

Thus it is an advantage of the present invention to adjust a current page value with precision by using a slider and arrows of a scroll bar.

Yet another advantage of the present invention is to allow a user to select a page value with precision even when the scroll bar region comprises fewer pixels than the range of the number of pages.

It is also an advantage of the present invention to select and view exact pages of a document without downloading any unwanted pages.

Another advantage of the present invention is to select and view a particular page in a very large document whose numbers of pages exceed the resolution (number of pixels) contained in the scroll bar region.

According to one aspect of the invention, a computer executes a method as part of a computer program. The method displays a page selected by a user from of a plurality of pages of a document. The computer comprises a display monitor which displays a scroll bar, a button, a current page value and a total number of pages of the document. The method comprises the steps of: (a) selecting a current page value from said pages of said document by using a scroll bar; (b) displaying said current page value on said display monitor; (c) displaying on said display monitor said page based on said current page value if said button is active and selected by said user; and (d) displaying said page if said button is inactive.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF THE PREFERRED EMBODIMENTS

Figure 1:
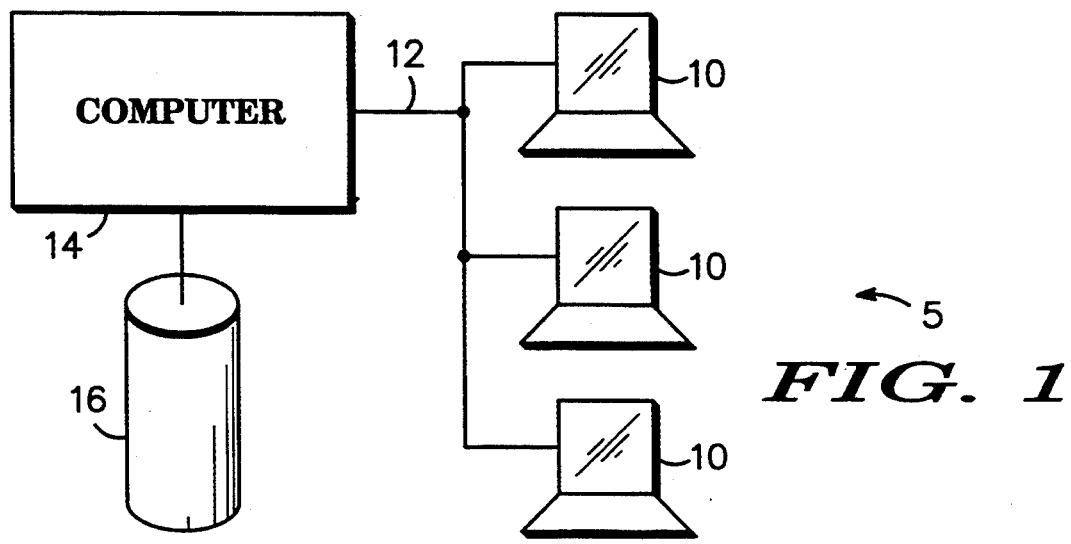
FIG. 1 shows a configuration of a network system according to a preferred embodiment of the invention.

FIG. I shows a configuration of a network system 5 according to a preferred embodiment of the invention. As shown in FIG. 1, a number of different workstations 10 are connected via a network 12 to computer 14. Computer 14 is connected to database 16 which stores information, including documents, text, pictures or other different types of information.

Each of the workstations 10 is any computer including any type of personal computer that is commercially available from SUN, Apple, IBM, Honeywell or some other computer manufacturer. Workstations 10 usually include a screen or display monitor, a keyboard, a mouse and some type of processing and memory capability. Although a number of workstations 10 are shown in FIG. 1, the hardware configuration could have a single workstation 10 without being connected via a network 12 to a main computer 14. At least one computer is needed to execute the method for selecting and displaying information on a computer.

Network 12 can be any type of network configuration, including but not necessarily limited to local-area-networks, coaxial cables, telephone connections or some type of optical fiber network such as available from AT&T or IBM.

Main computer 14 is a network server or a central computer that is used for storing and retrieving information from database 16 for each of the workstations 10. Each of the workstations 10 may execute an application program which permits a user to gain access to database 16 via computer 14. The application program contains a user interface such as a scroll bar for scrolling through pages of information. Such information may be retrieved and displayed on the display monitor of workstation 10 for a user.

Database 16 stores at least one document which comprises at least one page of information. Database 16 may also store other types of information including but not necessarily limited to graphics, tables, pictures or text. Database 16 stores information in blocks, groups or increments of information. Although a "page" of information is referred to throughout this description to describe how a document is partitioned, information can also be partitioned into other types of divisions, segments or groups.

Although network system 5 is configured as shown in FIG. 1, network system 5 can have any type of hardware configuration, including a network system having three main frames and three separate networks. Moreover, a user can obtain information from any source including from the user's own workstation 10 or from a remote location.

Figure 2:
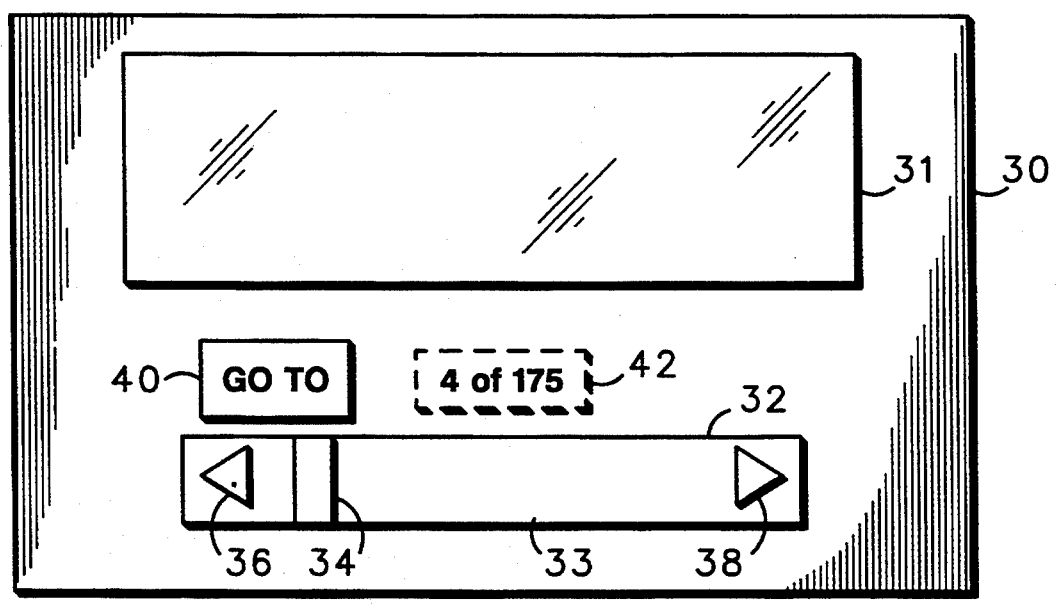
FIG. 2 shows a scroll bar and corresponding "GO-TO" button according to a preferred embodiment of the invention.

FIG. 2 shows a scroll bar 32 and "GO TO" button 40 according to a preferred embodiment of the invention. As shown in FIG. 2, a display monitor 30 (which is a part of workstation 10) comprises a window or an information viewing area 31, a scroll bar 32, a "GO TO" button 40 and a page number display area 42. Window or information viewing area 31 is where text or raster images are displayed. The size of the information viewing area 31 can be reduced or increased in size depending on the size of the display monitor 30 or whether multiple windows are open in a multiple windows environment.

Scroll bar 32 comprises a scroll bar region 33, a slider 34, a left arrow 36 and a right arrow 38. Scroll bar region 33 reduces or increases in size depending on the size of window 31. If the size of window 31 increases, the size or space of scroll bar region 33 also increases. Similarly, if the size of window 31 decreases, the size of the scroll bar region 33 decreases.

Slider 34 moves within scroll bar region 33 between left arrow 36 and right arrow 38. If a user wants to move slider 34, the user moves a cursor via a mouse to the currently displayed position of slider 34. The user than presses a button on the mouse. This action selects slider 34 and the user by moving the mouse, can simultaneously control the positioning of slider 34 within scroll bar region 33.

Slider 34 is a coarse adjustment for scrolling through a document. For example, a one pixel movement of slider 34 may result in moving ten pages in a document. This is usually caused when the number of pixels within the scroll bar region 33 is too small to adequately represent all the pages of a document. However, if the scroll bar region 33 is large and the number of pages of a document is small, the movement of slider 34 may result in moving to a next page of a document or incrementing by one page without passing over any pages by a large incremental amount.

Left arrow 36 is for moving from the current page or position within a document toward the first page of a document. In contrast, right arrow 38 is used to move from the current page or position within a document toward the last page. Left arrow 36 and right arrow 38 are selected via a mouse in a similar manner as explained above for selecting slider 34 via a mouse. The user moves the mouse-controlled cursor on either of the arrows and pushes a mouse button. Slider 34 will begin moving in the direction dictated by which arrow is selected and the page number 42 will begin updating based on its current page or position within a document.

"GO TO" button 40 is one of the special and unique features of the present invention that controls when a page of information is or is not displayed. The activation and selection of "GO TO" button 40 will be described in greater detail below in conjunction with the discussion of the flowchart in FIG. 3.

Area 42 of display monitor 30 displays the present position or current page that is selected by a user and the total number of pages. Area 42 displays the present position and the total number of pages in the following manner:

<current page> of <total number of pages>

As shown in FIG. 2, "4" or the first number before "of" represents the current page number. The second number or the number following the "of" represents the total number of pages in the selected document. As shown in FIG. 2, the second number is "175" which represents that 175 pages of information can be displayed for a particular document.

Figure 3:
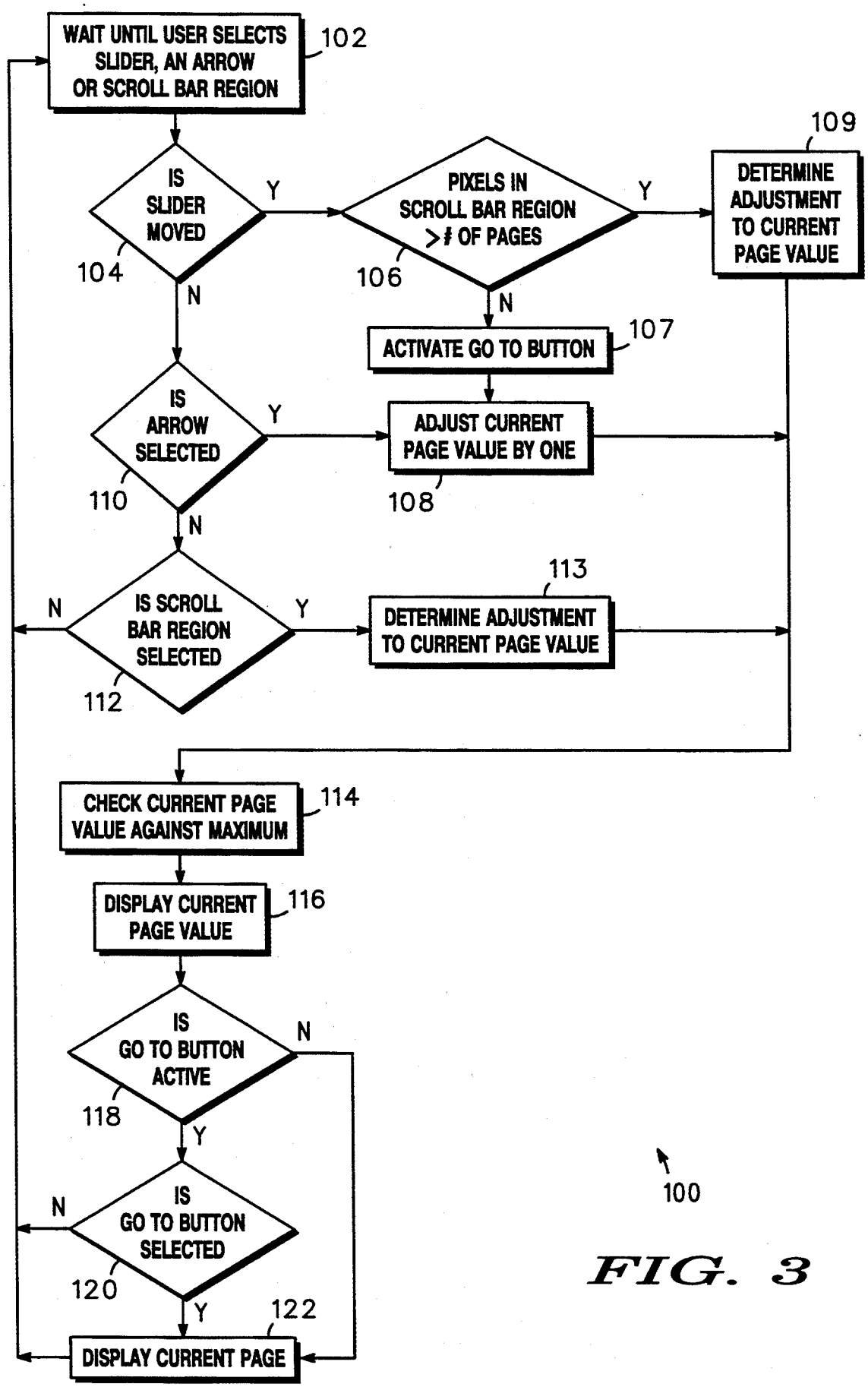
FIG. 3 shows a flowchart of a method for selecting and viewing pages of a document with precision according to a preferred embodiment of the invention.

FIG. 3 shows a flowchart of a method 100 for selecting and viewing pages of a document with precision according to a preferred embodiment of the invention. According to FIG. 3, method 100 begins and waits at step 102 until a user selects slider 34, left arrow 36, right arrow 38 or scroll bar region 33. The user selects one of the scroll bar features using a mouse as explained above or by using some other method of selection, such as a touch-screen, for example.

To reach step 102 of method 100, a user would have selected and retrieved a document comprising one or more pages from computer 14 or internally from the user's own workstation 10. When the document is first selected by a user at workstation 10, method 100 defaults to the first page of the document and sets the current page value to one. Method 100 than retrieves the first page of the document and displays it in window 31. The number "1" is displayed before the "of" in area 42 to represent that the first page is being displayed in window 31. The total number of pages of a document is displayed after the "of" in area 42.

Once the user selects slider 34, left arrow 36, right arrow 38 or scroll bar region 33, method 100 determines in step 104 whether slider 34 was moved. If slider 34 was moved, method 100 next determines in step 106 what adjustment will be made to the current page value. This result is dependent on the size of the scroll bar region 33 and the number of pages of the document. If method 100 determines in step 106 that the number of pixels within scroll bar region 33 is greater than or equal to the total number of pages within a document, method 100 in step 107 activates "GO TO" button 40 and increments or decrements in step 108 the current page value by one page according to which direction slider 34 was moved. The reason for activating the "GO TO" button 40 in step 107 will be discussed in more detail below.

If method 100 determines in step 106 that the number of pixels within scroll bar region 33 is less than the total number of pages, method 100 adjusts in step 109 the current page value by a number greater than one. Method 100 may accomplish this in at least one of two ways, although method 100 is not restricted to only these disclosed methods. First, the current page value could be adjusted by a predetermined amount such as ten pages. This means that the page number will increase or decrease in increments of ten pages.

The second way to determine the adjustment to the current page value is to divide the total number of pages by the number of pixels in the scroll bar region 33 and to round the resulting number to the nearest whole number. For example, if there were 100 pages and only 12 pixels available in scroll bar region 33, the coarse adjustment to the current page value may be set to 8 (i.e., $100/12 = 8.333 \rightarrow 8$).

If slider 34 was not moved in step 104, method 100 determines in step 110 whether the user selected or pressed one of the arrows 36, 38. If left arrow 36 or right arrow 38 was pressed, method 100 adjusts in step 108 the current page value according to which arrow was pressed (i.e., decrement the current page value by one page for selection of left arrow 36 and increment the current page value by one page for selection of right arrow 38). As discussed above, arrows 36, 38 only make a fine adjustment to the current page value in increments of one. Coarse adjustments to the current page value are made by slider 34.

If method 100 determines in step 110 that none of the arrows were pressed, method 100 next determines in step 112 whether the scroll bar region 33 was selected. If the scroll bar region was selected via a cursor-controlled mouse, for example, method 100 determines in step 113 what incremental or decremental adjustment will be made to the current page value. This incremental or decremental adjustment value may have a predetermined or calculated value.

If the scroll bar region was not selected in step 112, method 100 returns to step 102 to wait until a user selects slider 34, left 36 or right 38 arrow or scroll bar region 33. No error message will be output since the user may have selected slider 34 but did not move it.

Once the adjustments are made to the current page value in step 109, step 108 or step 113, method 100 determines in step 114 whether the current page value falls below a minimum page value or above a maximum page value. Method 100 compares the current page value to the minimum page number and the total number of pages. If the current page value is less than the minimum page number, which is usually one, the current page value is reset to one. If the current page value exceeds the maximum or total number of pages of a document, the current page value is set to the number of the last page of the document or the total number of pages of the document.

Once the current page value is error-checked in step 114, method 100 displays in step 116 the current page value in area 42. This feature is highly useful because a user will instantly know the most up-to-date position or current position within a document.

Next, method 100 checks in step 118 whether "GO TO" button 40 is active. If "GO TO" button is active, method 30 does not retrieve or display the current page every time the current page value or number changes. The user must select "GO TO" button 40 (via a mouse) before the current page is retrieved and displayed. If the "GO TO" button is inactive, method 30 retrieves and displays the current page every time the current page value changes.

"GO TO" button 40 is active when method 100 activates it in step 107 or if the user selects it via a mouse. Method 100 automatically activates "GO TO" button 40 in step 107 when the pixel resolution of the scroll bar region 33 is less than the number of pages of information being displayed. This means that the number of pages of a document exceeds the number of pixels in the scroll bar region 33 and therefore, some or all of the pixels in scroll bar region 33 represent more than one page. If "GO TO" button 40 is inactive, method 100 proceeds to step 122 where the current page represented by the current page value is retrieved from database 16 and displayed in window 31 of the user's workstation 10.

If method 100 determines that "GO TO" button 40 is active in step 118, method 100 next determines in step 120 whether the user has pushed, pressed or selected "GO TO" button 40. If the user has pressed via a mouse or some other method or means "GO TO" button 40, method 100 displays in step 122 the current page based on the current page value. Otherwise, method 100 returns to step 102 to wait for the next action taken by a user. Step 120 permits a user to bypass display step 122 until the user is able to select the exact page. A user must use "GO TO" button 40 to cause the displayed current page value to be yielded for processing.

It will be appreciated by those skilled in the art that the present invention permits a user to precisely select a certain page of a document without needlessly obtaining and displaying unwanted pages of a document.

Accordingly, it is intended by the appended claims to cover all modifications of the invention that fall within the true spirit and scope of the invention. For example, "GO TO" button 40 may have another label such as "MOVE TO" or "SELECT".

What is claimed is:

1. A method performed by a computer as part of computer program, the computer having a monitor capable of displaying one or more pages from a document stored by the computer, the method comprising the steps of:
    (a) displaying a scroll bar on the monitor;
    (b) obtaining user selection of a pixel position along the scroll bar representing a relative location of one of the pages within the document;
    (c) determining whether a number of pages in the document is greater than a number of selectable pixel positions along the scroll bar;
    (d) displaying a page corresponding to the user selection when it is not determined in step (c) that the number of pages in the document is greater than the number of selectable pixel positions along the scroll bar;
    (e) performing, when it is determined in step (c) that the number of pages in the document is greater than the number of selectable pixel positions along the scroll bar, the steps of
    (e1) activating a page display button,
    (e2) displaying a page number of the page corresponding to the user selection,
    (e3) obtaining additional user input to adjust the user selection until the desired page number is displayed, and
    (e4) displaying the desired page only upon user selection of the page display button.

2. The method of claim 1 wherein
    step (a) comprises displaying the scroll bar with a slider button moveable therealong and with a page decrementing button at one end and a page incrementing button at the other end, and
    step (e3) comprises obtaining user selection of the page decrementing button to decrement the page number or the page incrementing button to increment the page number until the desired page number is displayed.

3. The method of claim 1 wherein step (b) comprises displaying the page number of the selected page continually while obtaining the user selection of the pixel position along the scroll bar.

4. The method of claim 3 wherein step (b) comprises displaying the page number obtained as the result of dividing the number of pages by the number of pixels and rounding to the nearest integer.

5. The method of claim 3 wherein step (b) comprises displaying a total number of pages in the document alongside the page number of the selected page.

6. A method performed by a computer as part of computer program, the computer being connected to a database and having a monitor capable of displaying one or more pages from a document stored by the database, the method comprising the steps of:
    (a) displaying a scroll bar on the monitor;
    (b) obtaining user selection of a pixel position along the scroll bar representing a relative location of one of the pages within the document;
    (c) determining whether a number of pages in the document is greater than a number of selectable pixel positions along the scroll bar;
    (d) retrieving from the database and displaying a page corresponding to the user selection when it is not determined in step (c) that the number of pages in the document is greater than the number of selectable pixel positions along the scroll bar;
    (e) performing, when it is determined in step (c) that the number of pages in the document is greater than the number of selectable pixel positions along the scroll bar, the steps of
    (e1) activating a page display button,
    (e2) displaying a page number of the page corresponding to the user selection,
    (e3) obtaining additional user input to adjust the user selection until the desired page number is displayed, and
    (e4) retrieving from the database and displaying the desired page only upon user selection of the page display button.

7. The method of claim 6 wherein
    step (a) comprises displaying the scroll bar with a slider button moveable therealong and with a page decrementing button at one end and a page incrementing button at the other end, and
    step (e3) comprises obtaining user selection of the page decrementing button to decrement the page number or the page incrementing button to increment the page number until the desired page number is displayed.

8. The method of claim 6 wherein step (b) comprises displaying the page number of the selected page continually while obtaining the user selection of the pixel position along the scroll bar.

9. The method of claim 8 wherein step (b) comprises displaying the page number obtained as the result of dividing the number of pages by the number of pixels and rounding to the nearest integer.

10. The method of claim 8 wherein step (b) comprises displaying a total number of pages in the document alongside the page number of the selected page.

11. A method performed by a computer as part of computer program, the computer being connected to a server over a network and having a monitor capable of displaying one or more pages from a document stored by the server, the method comprising the steps of:
    (a) displaying a scroll bar on the monitor;

(b) obtaining user selection of a pixel position along the scroll bar representing a relative location of one of the pages within the document;

(c) determining whether a number of pages in the document is greater than a number of selectable pixel positions along the scroll bar;

(d) retrieving from the server over the network and displaying a page corresponding to the user selection when it is not determined in step (c) that the number of pages in the document is greater than the number of selectable pixel positions along the scroll bar;

(e) performing, when it is determined in step (c) that the number of pages in the document is greater than the number of selectable pixel positions along the scroll bar, the steps of (e1) activating a page display button, (e2) displaying a page number of the page corresponding to the user selection, (e3) obtaining additional user input to adjust the user selection until the desired page number is displayed, and (e4) retrieving from the database and displaying the desired page only upon user selection of the page display button.

12. The method of claim 11 wherein step (a) comprises displaying the scroll bar with a slider button moveable therealong and with a page decrementing button at one end and a page incrementing button at the other end, and step (e3) comprises obtaining user selection of the page decrementing button to decrement the page number or the page incrementing button to increment the page number until the desired page number is displayed.

13. The method of claim 11 wherein step (b) comprises displaying the page number of the selected page continually while obtaining the user selection of the pixel position along the scroll bar.

14. The method of claim 13 wherein step (b) comprises displaying the page number obtained as the result of dividing the number of pages by the number of pixels and rounding to the nearest integer.

15. The method of claim 13 wherein step (b) comprises displaying a total number of pages in the document alongside the page number of the selected page.

* * * * *